US008622881B1

(12) United States Patent
Harada et al.

(10) Patent No.: US 8,622,881 B1
(45) Date of Patent: Jan. 7, 2014

(54) CONDUCTIVE MEMBER, ELECTROPHOTOGRAPHIC APPARATUS, AND PROCESS CARTRIDGE

(71) Applicant: Canon Kabushiki Kaisha, Tokyo (JP)

(72) Inventors: Masaaki Harada, Yokohama (JP); Keiji Nose, Suntou-gun (JP); Hiroaki Watanabe, Odawara (JP); Takumi Furukawa, Susono (JP); Kenya Terada, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/843,892

(22) Filed: Mar. 15, 2013

Related U.S. Application Data

(63) Continuation of application No. PCT/JP2012/006659, filed on Oct. 18, 2012.

(30) Foreign Application Priority Data

Sep. 21, 2012 (JP) ................................ 2012-207958

(51) Int. Cl.
*F16C 13/00* (2006.01)
*G03G 15/02* (2006.01)

(52) U.S. Cl.
USPC ................ 492/56; 492/53; 492/49; 399/115; 399/176

(58) Field of Classification Search
USPC ................ 492/53, 56, 49, 60; 29/895–895.33
See application file for complete search history.

(56) References Cited

U.S. PATENT DOCUMENTS

| | | | |
|---|---|---|---|
| 5,198,685 A | 3/1993 | Kitani et al. | |
| 7,452,960 B2 * | 11/2008 | Yano et al. | 528/361 |
| 7,486,911 B2 | 2/2009 | Harada | |
| 7,693,457 B2 | 4/2010 | Kuruma et al. | |
| 7,727,135 B2 * | 6/2010 | Urano et al. | 492/56 |

(Continued)

FOREIGN PATENT DOCUMENTS

| | | |
|---|---|---|
| JP | 11-45013 A | 2/1999 |
| JP | 2006-265379 A | 10/2006 |
| JP | 2008-13704 A | 1/2008 |
| JP | 2008-299120 A | 12/2008 |

OTHER PUBLICATIONS

PCT International Search Report and Written Opinion of the International Searching Authority, International Application No. PCT/JP2012/006659, Mailing Date Dec. 11, 2012.

(Continued)

*Primary Examiner* — Sarang Afzali
(74) *Attorney, Agent, or Firm* — Fitzpatrick, Cella, Harper and Scinto

(57) ABSTRACT

The conductive member has a conductive support and a conductive elastic layer. The elastic layer is a mixture containing an electron conductive agent and a binder polymer, or a cured product thereof, and the electron conductive agent contains a carbon black satisfying the following characteristics: (i) an average primary particle diameter is 20 nm or more and 30 nm or less; (ii) a DBP oil absorption is 40 ml/100 g or more and 70 ml/100 g or less, and the total amount of CO and $CO_2$ generated by temperature programmed desorption/mass spectrometry is 0.30 mass % or more and 0.80 mass % or less with reference to the carbon black; and (iii) the amount of $SO_2$ generated by the temperature programmed desorption/mass spectrometry is 0.05 mass % or more with reference to the carbon black.

7 Claims, 3 Drawing Sheets

(56) References Cited

U.S. PATENT DOCUMENTS

| | | | | |
|---|---|---|---|---|
| 7,962,068 | B2 | 6/2011 | Kuroda et al. | |
| 8,440,307 | B2 | 5/2013 | Nose et al. | |
| 8,445,113 | B2 | 5/2013 | Furukawa et al. | |
| 8,481,167 | B2 | 7/2013 | Watanabe et al. | |
| 2008/0102391 | A1* | 5/2008 | Yanagawa et al. | 430/69 |
| 2011/0176833 | A1 | 7/2011 | Harada et al. | |
| 2012/0045250 | A1 | 2/2012 | Harada et al. | |
| 2012/0076539 | A1 | 3/2012 | Sato et al. | |
| 2012/0141161 | A1 | 6/2012 | Watanabe et al. | |
| 2012/0224887 | A1 | 9/2012 | Harada et al. | |
| 2012/0315065 | A1* | 12/2012 | Akiba et al. | 399/175 |
| 2013/0039677 | A1 | 2/2013 | Nose et al. | |

OTHER PUBLICATIONS

Watanabe, et al., U.S. Appl. No. 13/915,563, filed Jun. 11, 2013.
Suzuki, et al., U.S. Appl. No. 13/929,378, filed Jun. 27, 2013.
Nose, et al., U.S. Appl. No. 13/911,806, filed Jun. 6, 2013.
Harada, et al., U.S. Appl. No. 13/695,781, filed Nov. 1, 2012.

* cited by examiner

CONDUCTIVE MEMBER, ELECTROPHOTOGRAPHIC APPARATUS, AND PROCESS CARTRIDGE

CROSS-REFERENCE TO RELATED APPLICATIONS

This application is a continuation of International Application No. PCT/JP2012/006659, filed Oct. 18, 2012, which is claims the benefit of Japanese Patent Application No. 2012-207958, filed Sep. 21, 2012.

BACKGROUND OF THE INVENTION

1. Field of the Invention

The present invention relates to a conductive member such as a charging member that can be used while being brought into abutment with a photosensitive member in an electrophotographic apparatus, and to an electrophotographic apparatus and a process cartridge.

2. Description of the Related Art

In an electrophotographic image-forming apparatus, a conductive member having a conductive elastic layer has been used in, for example, each of a charging member, a developing member, a transferring member, and a paper-feeding member. It has been desired that such conductive elastic layer have semiconductivity, e.g., an electric resistance value of about $1\times10^3$ Ω·cm or more and $1\times10^9$ Ω·cm or less in terms of specific volume resistivity. It has been known that a conductive rubber obtained by compounding a base rubber with carbon black is used in the elastic layer.

Japanese Patent Application Laid-Open No. H11-45013 discloses a member for OA equipment including an elastic body layer formed of a semiconductive rubber material whose specific volume resistance has been adjusted by adding carbon black. In addition, Japanese Patent Application Laid-Open No. H11-45013 describes that a carbon black having a nitrogen adsorption specific surface area of 20 to 150 $m^2/g$ and a DBP oil absorption of 60 to 180 ml/100 g is used as the carbon black. In addition, an example of the literature describes that a carbon black having a nitrogen adsorption specific surface area of 32 $m^2/g$ and a DBP oil absorption of 140 ml/100 g (trade name: SEAST G-SVH; manufactured by TOKAI CARBON CO., LTD.) was used. In addition, Japanese Patent Application Laid-Open No. H11-45013 describes the following concerning the significance of the numerical range of the DBP oil absorption. When the DBP oil absorption is less than 60 ml/100 g, the structure of the carbon black develops to so low a degree that a large amount of the carbon black needs to be added for eliciting conductivity, thereby leading to an increase in rubber hardness. On the other hand, when the DBP oil absorption exceeds 180 ml/100 g, the structure develops to so high a degree that even the compounding of a small amount of the carbon black causes an excessive change in electric resistance value of the elastic layer, thereby making it difficult to adjust the electric resistance.

By the way, it has been generally known that the dispersibility of the carbon black in a rubber can be improved by reducing the specific surface area of the carbon black, i.e., increasing its particle diameter or by increasing the number of its structures. In addition, the degree to which the structure of the carbon black develops can be evaluated by its DBP oil absorption. This is because a percentage of voids between the aggregates of the carbon black has a positive correlation with the structure of the carbon black. In addition, the DBP oil absorption of the carbon black currently on the market is about 40 to 180 ml/100 g.

Therefore, it can be understood that a carbon black excellent in dispersibility in a rubber and having a large DBP oil absorption has been selected as the carbon black described in Japanese Patent Application Laid-Open No. H11-45013.

SUMMARY OF THE INVENTION

An investigation conducted by the inventors of the present invention has found that large electric resistance unevenness may occur in a conductive elastic layer formed by using a rubber composition obtained by dispersing such carbon black having a large DBP oil absorption as described in Japanese Patent Application Laid-Open No. H11-45013 in a rubber. Specifically, the electric resistance of the conductive elastic layer covering the circumference of the mandrel of a roller-shaped conductive member formed by co-extruding a conductive rubber composition, which has been obtained by kneading the carbon black having a large DBP oil absorption and the rubber, with a cross head together with the mandrel may vary in its circumferential direction.

In view of the foregoing, the present invention is directed to providing a conductive member for electrophotography including a conductive elastic layer showing small electric resistance unevenness. Further, the present invention is directed to providing a process cartridge and an electrophotographic apparatus that contribute to the formation of high-quality electrophotographic images.

According to one aspect of the present invention, there is provided a conductive member, including: a conductive support; and a conductive elastic layer, in which: the elastic layer includes a mixture containing an electron conductive agent and a binder polymer, or a cured product of the mixture; and the electron conductive agent contains a carbon black having the following characteristics (i) to (iii):

(i) an average primary particle diameter is 20 nm or more and 30 nm or less;

(ii) a DBP oil absorption is 40 ml/100 g or more and 70 ml/100 g or less; and (iii) a total amount of CO and $CO_2$ generated by temperature programmed desorption/mass spectrometry is 0.30 mass % or more and 0.80 mass % or less with reference to the carbon black, and an amount of $SO_2$ generated by the temperature programmed desorption/mass spectrometry is 0.05 mass % or more with reference to the carbon black.

According to another aspect of the present invention, there is also provided a process cartridge that is attachable to and detachable from a main body of an electrophotographic apparatus, including: a charging member; and an electrophotographic photosensitive member placed to be chargeable by the charging member.

According to still another aspect of the present invention, there is also provided an electrophotographic apparatus, including: a charging member; and an electrophotographic photosensitive member placed to be chargeable by the charging member.

According to the present invention, the conductive member for electrophotography including a conductive elastic layer showing small electric resistance unevenness can be obtained. According to the present invention, the process cartridge and the electrophotographic apparatus that contribute to the formation of high-quality electrophotographic images can also be obtained.

Further features of the present invention will become apparent from the following description of exemplary embodiments with reference to the attached drawings.

DESCRIPTION OF THE EMBODIMENTS

Figure 1:
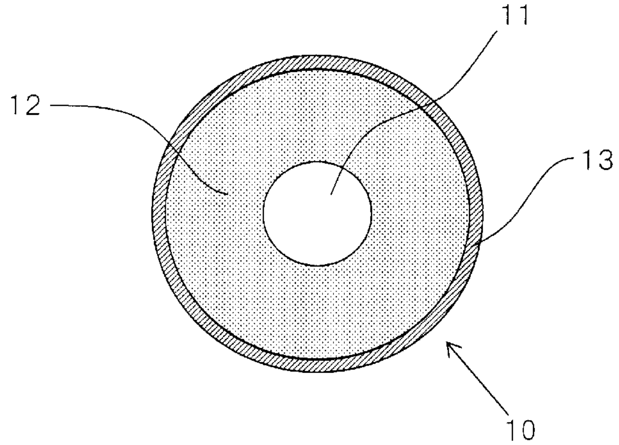
FIG. 1 is a schematic cross-sectional diagram illustrating a configuration example of a charging roller.

The inventors of the present invention have conducted an investigation on the reason why electric resistance unevenness occurs in a conductive elastic layer formed by using a conductive rubber composition obtained by dispersing a carbon black having a large DBP oil absorption in a rubber. As a result, the inventors have found that the dispersed state of the carbon black having a large DBP oil absorption in the rubber composition containing the carbon black changes in an extremely easy fashion owing to a slight fluctuation in shear to the rubber composition because the dispersibility of the carbon black in the rubber is good.

A high shear is typically applied at the time of the dispersion of the carbon black in the rubber. After that, the extrusion molding of the rubber composition is performed in order that an elastic layer having a desired shape may be obtained. At this time, when the dispersibility of the carbon black in the rubber is high, the state of existence of the carbon black in the rubber easily changes owing even to a slight fluctuation in shear applied to the rubber composition at the time of the extrusion molding. This may be the reason why the electric resistance unevenness is liable to occur locally in the conductive elastic layer when the carbon black having a high DBP oil absorption is used.

Based on such discussion, the inventors of the present invention have attempted to use, as the carbon black to be incorporated into the conductive elastic layer, a carbon black having bad dispersibility in the rubber, a small particle diameter, and a low structure, specifically, a carbon black having an average primary particle diameter of 20 nm or more and 30 nm or less, and a DBP oil absorption of 40 ml/100 g or more and 70 ml/100 g or less.

That is, the inventors have considered that when such carbon black can be favorably dispersed in the rubber by applying a high shear to the rubber composition obtained by mixing the carbon black into the rubber, the dispersed state of the carbon black does not change owing to a low shear at the time of the extrusion molding thereafter and hence a conductive elastic layer showing small electric resistance unevenness is obtained. However, such carbon black is so poor in dispersibility in the rubber that it has been difficult to favorably disperse the carbon black in the rubber even by applying a high shear. As a result, the aggregate of the carbon black due to insufficient dispersion of the carbon black has been observed in the elastic layer of the resultant charging member in some cases. In addition, when an electrophotographic photosensitive member is charged with such charging member, the occurrence of a charging failure derived from the presence of the carbon black aggregate in the elastic layer and a spot on an electrophotographic image resulting from the failure has been observed in some cases.

In view of the foregoing, the inventors of the present invention have paid attention to a surface functional group of the carbon black. The carbon black typically has a functional group such as a carboxyl group, a hydroxyl group, a quinone group, or a lactone group on its surface. In addition, such surface functional group affects the dispersibility of the carbon black in the rubber to some extent. That is, a carbon black having a larger number of surface functional groups tends to be more easily dispersed in the rubber.

In view of the foregoing, the inventors of the present invention have conducted an investigation by using a carbon black having a small particle diameter, a small DBP oil absorption, and a large number of surface functional groups for achieving compatibility between the dispersibility and the stability of the electric resistance. As a result, the inventors have improved the dispersibility in the rubber but have found a new problem in that the electric resistance gradually fluctuates in the step of processing the rubber composition.

In view of the foregoing, the inventors have conducted a further investigation on the reason why the carbon black having a large number of surface functional groups causes the problem. As a result, the inventors have revealed that the functional groups present on the surface of the carbon black are classified into a functional group that easily leaves from the surface of the carbon black, i.e., a functional group having low stability and a functional group that does not easily leave therefrom, i.e., a functional group having high stability, and that in the case of a carbon black having a large number of functional groups each having low stability present on its surface, the abundance of the surface functional groups changes in the step of dispersing the carbon black in the rubber and hence the electric resistance is liable to fluctuate. Specifically, the inventors have found the following. Functional groups each formed of a carbon atom, an oxygen atom, and a hydrogen atom such as a carboxyl group, a quinone group, and a lactone group each have low stability, and hence each of the groups has been liable to cause the fluctuation in electric resistance in the step of processing the rubber composition. In contrast, a functional group containing a sulfur atom such as a sulfonyl group has high stability and hence hardly causes the fluctuation in electric resistance in the step of processing the rubber composition.

In the light of the foregoing findings, the inventors of the present invention have reached the conclusion that a carbon black having a small particle diameter, a low structure, a small number of functional groups each formed of a carbon atom, an oxygen atom, and a hydrogen atom, and a large number of functional groups each containing a sulfur atom is suitable for the achievement of the objects of the present invention. That is, such carbon black has moderate dispersibility in the rubber composition and its dispersed state in the rubber composition seldom changes owing to a slight fluctuation in shear applied to the rubber composition. Accordingly, it can be said that the carbon black is extremely suitable for the mass production of a conductive elastic layer showing small electric resistance unevenness.

Hereinafter, a preferred embodiment of the present invention is described.

<Conductive Member>

A conductive member of the present invention has a conductive support and a conductive elastic layer. In addition, the conductive member can have any other layer (such as an adhesion layer or a surface layer) between the support and the elastic layer, or on the surface of the elastic layer. The conductive member of the present invention can be used as a conductive member to be used in an image-forming apparatus such as an electrophotographic apparatus or an electrostatic recording apparatus. The conductive member of the present invention can be used in, for example, each of a charging member, developing member, transferring member, and paper-feeding member to be used in such image-forming apparatus. It is to be noted that the shape of the conductive member can be appropriately selected and can be, for example, a roller shape or a belt shape. Hereinafter, description is given by paying particular attention to a roller-shaped charging member (charging roller).

(Charging Roller)

FIG. 1 illustrates a schematic cross-sectional diagram of a charging roller 10 as an example of the conductive member according to the present invention. The charging roller 10 can be constituted of a mandrel 11 as a conductive support and a conductive elastic layer 12 provided on its outer circumference, and as described above, a surface layer 13 can be provided on the outside (outer circumferential surface) of the elastic layer 12 as required. The charging roller 10 illustrated in FIG. 1 is constituted of the mandrel 11, the elastic layer 12, and the surface layer 13.

The MD-1 hardness of the surface of the elastic layer of the charging roller preferably falls within the range of 40° or more, in particular, 60° or more and less than 90°, in particular, less than 75°. Setting the value for the MD-1 hardness to 40° or more is conducive to the suppression of the occurrence of permanent compression set on the surface. In addition, setting the value for the MD-1 hardness to less than 90° contributes to additional suppression of the adhesion of toner or the like.

In addition, the electric resistance of the charging roller is preferably $1\times10^3\Omega$ or more, more preferably $1\times10^4\Omega$ or more from the viewpoint of leakage resistance, and is preferably $1\times10^7\Omega$ or less, more preferably $1\times10^6\Omega$ or less from the viewpoint of charging performance.

(Conductive Support)

The conductive support to be used in the present invention is not particularly limited and, for example, a conductive support known in the field of an electrophotographic apparatus can be used. The shape of the conductive support can be appropriately selected depending on the shape of the conductive member.

(Conductive Elastic Layer)

The conductive elastic layer to be used in the present invention is formed of a mixture containing a binder polymer and an electron conductive agent, or a cured product thereof. In addition, the layer contains a specific carbon black (first CB to be described later) as the electron conductive agent.

Binder Polymer

The binder polymer is not particularly limited as long as the binder polymer is a material showing rubber elasticity in the actual use temperature range of the conductive member. Thermosetting rubber materials obtained by compounding the following raw material rubbers with cross-linking agents and the following thermoplastic elastomers can be given as specific examples of the binder polymer (rubber material).

Examples of the raw material rubbers include a natural rubber (NR), an isoprene rubber (IR), a butadiene rubber (BR), a styrene-butadiene rubber (SBR), an isobutylene-isoprene rubber (IIR), an ethylene-propylene-diene terpolymer rubber (EPDM), an epichlorohydrin homopolymer (CO), an epichlorohydrin-ethylene oxide copolymer (ECO), an epichlorohydrin-ethylene oxide-allyl glycidyl ether terpolymer (AGE-CHC), an acrylonitrile-butadiene copolymer (NBR), a hydrogenated acrylonitrile-butadiene copolymer (H-NBR), a chloroprene rubber (CR), and an acrylic rubber (ACM, ANM).

Examples of the cross-linking agents include sulfur and peroxides.

In addition, examples of the thermoplastic elastomers include a polyolefin-based thermoplastic elastomer, a polystyrene-based thermoplastic elastomer, a polyester-based thermoplastic elastomer, a polyurethane-based thermoplastic elastomer, a polyamide-based thermoplastic elastomer, and a vinyl chloride-based thermoplastic elastomer.

Carbon Black

The carbon black (first CB) to be used in the present invention has the following characteristics (i) to (iii):

(i) an average primary particle diameter is 20 nm or more and 30 nm or less;

(ii) a dibutyl phthalate (DBP) oil absorption is 40 ml/100 g or more and 70 ml/100 g or less; and (iii) the total amount of CO and $CO_2$ generated by temperature programmed desorption/mass spectrometry is 0.30 mass % or more and 0.80 mass % or less with reference to the carbon black, and the amount of $SO_2$ generated by the temperature programmed desorption/mass spectrometry is 0.05 mass % or more with reference to the carbon black.

The characteristics (i) and (ii) mean that the first CB belongs to a category of carbon blacks for rubbers having the smallest particle diameter and showing the lowest degree of development of a structure. That is, the first CB has low dispersibility in the binder polymer from the viewpoints of its particle diameter and DBP oil absorption.

Each of the compounding ratio of the first CB in the mixture and the content of the first CB in the elastic layer is preferably 5 parts by mass or more, more preferably 15 parts by mass or more with respect to 100 parts by mass of the binder polymer or a cured product thereof from the viewpoint of the maintenance of the stability of the electric resistance. Further, each of the compounding ratio and the content is preferably 60 parts by mass or less, more preferably 40 parts by mass or less from the viewpoint of the optimization of the hardness of the elastic layer.

The average primary particle diameter of the carbon black to be used in the present invention can be measured at each of the stage of a raw material and the stage of the mixture. However, when any other carbon black (such as a second CB) is used in combination in addition to the first CB, the average primary particle diameter of each carbon black is preferably measured at the stage of a raw material.

When the average primary particle diameter of the carbon black is measured at the stage of a raw material, a dispersion is prepared by dispersing the carbon black as a raw material in chloroform by an ultrasonic cleaning method at a frequency of 200 KHz for 30 minutes and then a sample is produced by fixing the dispersion to a supporting film formed of, for example, copper.

In addition, when the average primary particle diameter of the carbon black is measured at the stage of the mixture obtained by dispersing the carbon black in the binder polymer, an ultrathin section having a thickness of 100 nm is produced from the mixture with a microtome and then a sample is produced by fixing the section to a supporting film. Next, such sample is observed with an electron microscope and photographed at a magnification of 80,000 to 100,000. Then, the arithmetic average particle diameter of 100 carbon black particles randomly selected from the resultant photograph is determined by calculating their particle diameters from their diameters on the photograph and the magnification of the photograph, and the arithmetic average particle diameter is defined as the average primary particle diameter of the carbon black.

In addition, the DBP oil absorption of the carbon black to be used in the present invention can be measured by the method described in JIS K6217-4 (2001).

As described above, functional groups are present on the surface of the carbon black. The kinds and amounts of those functional groups can be determined by analyzing a gas to be generated by heating the carbon black in an inert gas (such as a helium gas). When the surface functional groups of the carbon black are groups each having a carbonyl group such as a ketone group and a quinone group, a gas to be generated upon heating of the carbon black is carbon monoxide (CO). In addition, when the surface functional groups are, for example, a carboxyl group, a lactone group, and an ester group, carbon dioxide ($CO_2$) is generated. When the surface functional groups are a sulfonyl group and the like, sulfur dioxide ($SO_2$) is generated. For example, temperature programmed desorption/mass spectrometry (TPD-MS method) can be given as a specific method of measuring the amounts of the surface functional groups of the carbon black.

In addition, the first CB has such a characteristic that the total amount of a generated gas measured as CO or $CO_2$ by the TPD-MS method is 0.30 mass % or more and 0.80 mass % or less with reference to the carbon black, i.e., when the amount of the first CB is defined as 100 mass %. In addition, the first CB has such a characteristic that the amount of a generated gas measured as $SO_2$ by the TPD-MS method is 0.05 mass % or more with reference to the first CB.

That is, the first CB has surface functional groups of such kinds and amounts that in the TPD-MS method, the total amount of CO and $CO_2$ to be generated is 0.30 to 0.80 mass %, and the amount of $SO_2$ to be generated is 0.05 mass % or more. A small amount of functional groups each having low stability, the groups being each formed of a carbon atom, an oxygen atom, and a hydrogen atom, and a large amount of functional groups each having high stability, the groups each containing a sulfur atom, can be incorporated into the first CB by satisfying the amounts of the generated gases.

It is assumed that setting the total amount of generation of CO and $CO_2$ to 0.30 mass % or more and the amount of generation of $SO_2$ to 0.05 mass % or more can compensate for poor dispersibility of a carbon black having a small particle diameter and a small DBP oil absorption in the binder polymer. This may be because the wettability (affinity) of the carbon black with the binder polymer is maintained. In addition, when the amount of generation of CO and $CO_2$ is 0.80 mass % or less, changes in amounts of the surface functional groups of the carbon black in the processing step are small and hence the fluctuation in electric resistance in the processing step can be suppressed.

It is to be noted that specific kinds of the surface functional groups in the first CB (such as a quinone group and a lactone group) are not particularly limited as long as those requirements for the amounts of the generated gases are satisfied.

Further, the amount of generation of $SO_2$ with reference to the first CB in the first CB is preferably 0.06 mass % or more from the viewpoint of dispersibility. In addition, an upper limit therefor, which is not particularly limited, is preferably 0.15 mass % or less from the viewpoint of the optimization of the electric resistance.

A commercially available carbon black may be used as the first CB to be used in the present invention as long as the carbon black satisfies all of the respective requirements for the average primary particle diameter, the DBP oil absorption, and the amounts of the generated gases (that is, the amounts of the surface functional groups) described in the foregoing, and the commercially available carbon black may be subjected to a surface treatment. The commercial product of the first CB is a product available under the trade name "Raven 1170" from Columbian Carbon. It is to be noted that in commercially available carbon blacks investigated by the inventors of the present invention and known documents searched by the inventors of the present invention, the carbon black (first CB) satisfying the requirements described above was not found except the Raven 1170.

When the surface treatment of the commercially available carbon black is performed, a method for the surface treatment is not particularly limited and a generally known treatment method can be employed. A method of reducing the amounts of the functional groups on the surface of the carbon black is specifically, for example, a method involving subjecting the carbon black to a heating treatment in an inert gas. A method of providing the surface of the carbon black with a functional group to be measured as CO or $CO_2$ such as a carbonyl group or a carboxyl group is, for example, any one of the following methods.

That is, there are given a method involving exposing the carbon black to an oxidative gas atmosphere such as air, ozone, oxygen, or $NO_x$, a method involving subjecting the carbon black to a low-temperature oxygen plasma treatment, and a method involving subjecting the carbon black to a stirring treatment in an oxidizing aqueous solution of, for example, hydrogen peroxide, a hypohalous acid salt, a dichromate, a permanganate, or nitric acid. A method of providing the surface of the carbon black with a functional group to be measured as $SO_2$ such as a sulfonyl group is, for example, a method involving subjecting the carbon black to a stirring treatment in an aqueous solution of sulfuric acid.

In the present invention, a carbon black (second CB) having a large particle diameter and a low structure is preferably compounded as a dispersion aid into the mixture to be used in the formation of the elastic layer together with the first CB described above. The combined use of the second CB and the first CB, which has a small particle diameter and a low structure, and has a small amount of functional groups that generate CO or $CO_2$ upon heating, enables the following. That is, the dispersion of the carbon blacks (especially the first CB) in the binder polymer in the step of mixing the rubber composition (mixture-preparing step) is accelerated and hence uniform dispersion of the carbon blacks in the binder polymer can be easily performed.

The elastic layer according to the present invention may contain, in addition to the first CB, a carbon black (second CB) having the following characteristics (iv) and (v).

(iv) an average primary particle diameter is 70 nm or more and 300 nm or less, preferably 100 nm or more and 300 nm or less; and (v) a DBP oil absorption is 20 ml/100 or more and 70 ml/100 g or less, preferably 20 ml/100 g or more and 50 ml/100 g or less.

The characteristic (iv) means that the second CB belongs to a category of carbon blacks for rubbers having large particle diameters. In addition, the characteristic (v) means that the second CB belongs to a category of carbon blacks for rubbers in each of which a structure has not developed yet. In addition, it is extremely difficult for the second CB having those characteristics to form, in the rubber composition, the network structure of the carbon black needed for the formation of a conductive path. Accordingly, the second CB may have substantially no influence on the electric resistance of the conductive elastic layer.

Meanwhile, the second CB inhibits the aggregation of the first CB having an extremely small particle diameter in the mixture because the second CB has a large particle diameter. Accordingly, when the second CB is incorporated into the binder polymer together with the first CB, the second CB may function as a dispersant for dispersing the first CB in the binder polymer.

Medium thermal carbon (MT carbon) and semi-reinforcing furnace carbon (SRF carbon) classified into Group 9 in ASTM D1765 can be given as specific examples of the second CB. Of those, the MT carbon is preferably used as the second CB from the viewpoint of accelerating the dispersion of the carbon blacks and from the viewpoint of suppressing an increase in hardness of the elastic body layer.

The compounding ratio of the second CB in the mixture to be used in the formation of the elastic layer is preferably 10 parts by mass or more, more preferably 20 parts by mass or more with respect to 100 parts by mass of the binder polymer or the cured product thereof from the viewpoint of an improvement in dispersibility, and is preferably 60 parts by mass or less, more preferably 50 parts by mass or less from the viewpoint of the optimization of the hardness.

Other Components

A filler, a processing aid, a cross-linking aid, a cross-linking accelerator, a cross-linking supplement accelerator, a cross-linking retarder, and the like, which are generally used as compounding agents for a rubber, may be further added to the material for the elastic layer (mixture) as required.

Method of Producing Mixture

A mixing method for the raw materials (carbon blacks, binder polymer, and, as required, other components) may be exemplified by a mixing method involving using a internal mixer such as a Banbury mixer or a pressure kneader and a mixing method involving using an open mixer such as an open mill. Of those mixing modes, a mixing method involving using the internal mixer is more preferred because of high mixing efficiency. In the internal mixer such as a Banbury mixer or a pressure kneader, the carbon blacks can be mixed into the binder polymer with a high shear. The dispersion of the first CB, which is conductive particles having relatively low dispersibility in the binder polymer, in the binder polymer with a high shear in the dispersion mixing step together with the second CB such as MT carbon enables the following. That is, a material showing no fluctuation in degree of dispersion of the carbon blacks in the processing step after the mixing ending on the acquisition of the conductive member can be easily obtained.

Further, in the mixing step, the binder polymer is preferably divided and then mixed with any other raw material such as carbon black in stages. For example, two thirds of the total mass of the binder polymer and a compounding agent such as the carbon black are mixed before the remaining one third of the binder polymer is mixed into the mixture. When the binder polymer is divided and then mixed as described above, an apparent mass ratio of the carbon black to the binder polymer at the time of the dispersion of the carbon black can be increased, and hence the dispersion can be performed with an additionally high shear. When a carbon black concentration at the time of the dispersion of the carbon black and a carbon black concentration at the time of molding processing after the mixing differ from each other, the dispersed state of the carbon black at the time of the molding processing becomes additionally stable. That is, the carbon black concentration is high at the time of the mixing and hence the dispersion of the carbon black easily progresses. However, the carbon black concentration is low at the time of the molding and hence the change of the dispersed state becomes small. Specifically, it is preferred that the binder polymer be mixed in an amount of one half or more and two thirds or less of the total mass of the binder polymer with the carbon black and the like first, and then the remaining binder polymer be mixed into the mixture.

It is to be noted that the binder polymer to be divided and mixed refers to a raw material rubber when a thermosetting rubber material is used as the binder polymer, and refers to a thermoplastic elastomer when the thermoplastic elastomer is used as the binder polymer.

In the divided mixing of the binder polymer with the internal mixer, the mixing stage may be performed in one step, or may be performed in multiple steps, i.e., two or more steps. In consideration of production efficiency, the mixing stage is preferably performed in one step. Here, the mixing step includes: loading the materials into the internal mixer; mixing the materials; and taking the mixed materials out of the mixer. In the case of one-step divided mixing, for example, one half of the total mass of the binder polymer and the total amount of the carbon black are mixed. In this case, after it has been confirmed by means of the torque chart of a mixing blade at the time of the mixing processing or visual judgment that the carbon black has been mixed into the binder polymer, the remaining binder polymer is additionally added and mixed into the mixture.

In the case of the one-step mixing, however, a material fill factor in the mixer is low at the time of the mixing of the carbon black. Although a material fill factor suitable for mixing in the internal mixer varies depending on, for example, the specifications of the mixer, the factor is fixed in a certain range and, depending on a condition for the one-step mixing, the materials cannot be mixed owing to their insufficient filling amounts in some cases. In such case, for example, such amounts of the binder polymer and the carbon black that the optimum fill factor of the mixer is obtained are mixed at the same compounding ratios as those in the case of one half of the total mass of the binder polymer and the total amount of the carbon black, and then the mixed materials are taken out of the mixer once.

After that, the mixed materials thus taken out and the remaining binder polymer are mixed again with the mixer after their masses have been adjusted so that target compounding ratios and the optimum fill factor may be obtained. Such mixing is referred to as "two-step mixing."

Although the optimum fill factor of the mixer at the time of the dispersion of the carbon black varies depending on the kind of the mixer to be used and contents to be compounded, the fill factor is preferably set to 50 vol % or more and 70 vol % or less at the time of the dispersion of the carbon black. As long as the fill factor is 50 vol % or more, even when the mixing is performed in one step, a shear can be easily applied and hence the mixing can be easily performed. In addition, as long as the fill factor is 70 vol % or less, the occurrence of the aggregate of the carbon black can be suppressed with additional reliability.

Method of Producing Conductive Member

A method known in the field of an electrophotographic apparatus is applicable as a method of forming the conductive member and, for example, any one of the following methods can be employed.

That is, a method involving extruding the mixture (mixed rubber composition) that is unvulcanized into a tube shape with an extruder, subjecting the tube to vulcanization molding with a vulcanizer, pressing a mandrel into the molded product, and abrading the surface of the resultant to provide a desired outer diameter can be employed. A method involving co-extruding the mixture (mixed rubber composition) after the vulcanization into a cylindrical shape around the mandrel with an extruder mounted with a cross head, fixing the cylindrical product in a mold having a desired outer diameter, and heating the resultant to provide a molded body can also be employed. It is to be noted that such rubber composition can be a semiconductive rubber composition having an electric resistance value of about $1\times10^3$ Ω·cm or more and $1\times10^9$ Ω·cm or less in terms of specific volume resistivity.

It is to be noted that when, for example, a thermosetting rubber material is used as the binder polymer, the mixture containing the rubber material can be cured by, for example, heating and hence the elastic layer can be formed. With regard to conditions for the heating, for example, the heating can be performed at a temperature of 140° C. or more and 180° C. or less for 10 minutes or more and 60 minutes or less.

Figure 5:
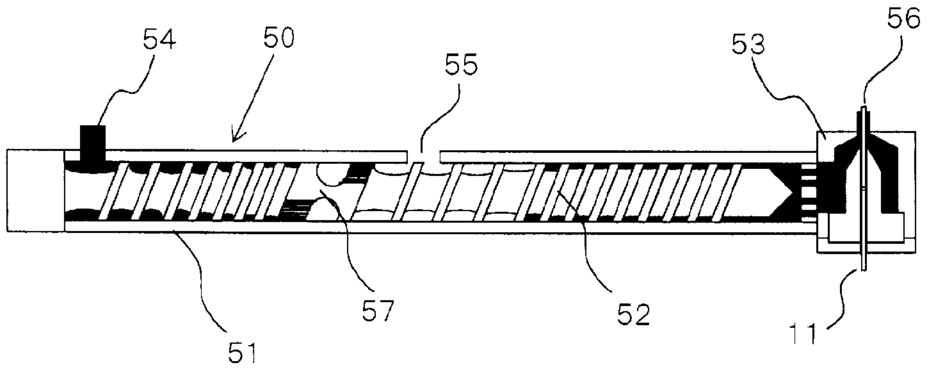
FIG. 5 is a diagram illustrating a schematic configuration example of a vent-type extruder mounted with a cross head.

Of the methods described above, the cross head extrusion molding method is suitable because of good productivity. FIG. 5 schematically illustrates the outline of a vent-type extruder mounted with a cross head. An extruder 50 has an extrusion screw 52 having a screw dam portion 57 rotatably interpolated into a cylinder 51. A cross head 53 is attached to the tip side end portion of the extrusion screw 52 of the cylinder 51. In addition, the cylinder 51 is provided with a vent port 55 and the vent port 55 is connected to a vacuum pump (not shown). The inside of the cylinder 51 is evacuated to a vacuum by the vacuum pump. An elastic layer material (the mixture) loaded from a material-loading port 54 is conveyed toward the cross head 53 by the rotation of the extrusion screw 52. The volatile matter of the elastic layer material is removed by the vacuum pump connected to the vent port 55 upon its passage through the inside of the cylinder. The elastic layer material conveyed to the cross head 53 is laminated on the outer circumference of the mandrel 11 supplied from a mandrel-supplying apparatus (not shown), passes a dice 56 at the tip of the cross head, and is co-extruded together with the mandrel 11.

Figure 3:
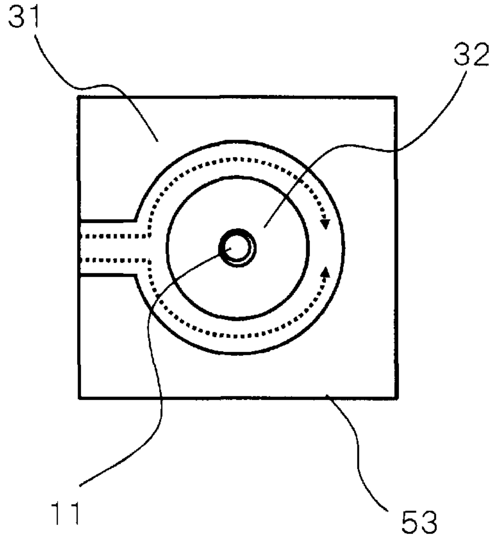
FIG. 3 is a schematic cross-sectional diagram of a cross head.

FIG. 3 illustrates a schematic cross-sectional diagram perpendicular to an extrusion direction in the cross head 53 for illustrating the flow of the material in the cross head 53. The cross head 53 is formed of an outer die 31 and an inner die 32. The material conveyed from the cylinder is bifurcated into two directions by the inner die 32 as indicated by arrows illustrated in FIG. 3. The flows of the material merge with each other again at the point (opposite side) opposite to the point at which the material has been bifurcated, and then the material is extruded so as to cover the outer circumferential portion of the mandrel 11. The merging portion is typically called a weld, and its flow path in the cross head is longer than that of any other portion and its thermal history is also longer than that of the other portion. Accordingly, the resistance of the material is liable to increase partially and the circumferential direction unevenness of the electric resistance of the elastic layer tends to occur.

The cylinder 51, extrusion screw 52, and cross head 53 of the extruder 50 are each appropriately kept at a designated temperature by a temperature regulator (not shown). The gas permeability of the rubber becomes larger as the temperature at the time of the extrusion (the temperature of the entirety of the extruder 50) increases. Accordingly, a vent effect becomes good and hence the amount of the volatile component of the elastic layer material can be reduced. However, when the extrusion temperature is increased, an increase in resistance of the weld portion tends to be remarkable and hence the circumferential direction unevenness of the electric resistance is liable to occur. Accordingly, the temperature at the time of the extrusion is preferably set to 60° C. or more and 110° C. or less.

In addition, the surface of the elastic layer may be subjected to surface modification by irradiating the surface of the elastic layer with a UV ray or an electron beam so that contamination such as toner or paper powder may hardly adhere to the surface. In addition, a surface layer may be further separately formed on the surface of the elastic layer.

A known covering layer is generally used as the surface layer, and for example, layers having desired electric resistance values obtained by appropriately dispersing the following conductive agents in the following binder polymers and sol-gel films each formed of a polysiloxane having an oxyalkylene group are used.

Examples of the binder polymers include an acrylic polymer, polyurethane, polyamide, polyester, polyolefin, and silicone. Examples of the conductive agents include: carbon black, graphite, and oxides such as titanium oxide and tin oxide; metals such as Cu and Ag; conductive particles made conductive by covering particles surfaces with an oxide or a metal; and ionic electrolytes such as $LiClO_4$, KSCN, NaSCN, and $LiCF_3SO_3$. As a method of forming the surface layer, there can be given, for example, a method involving coating an elastic layer surface with a liquid obtained by dissolving or dispersing the above-mentioned surface layer materials in a solvent by an application method such as a dipping method, a ring application method, a beam application method, a roll coater method, or a spraying method.

<Electrophotographic Apparatus>

As an electrophotographic apparatus, there can be exemplified an electrophotographic apparatus including a charging member and an electrophotographic photosensitive member placed so as to be chargeable by the charging member, the apparatus having such a configuration that the conductive member according to the present invention is used as the charging member. In addition, the conductive member according to the present invention can be used in a process cartridge that is attachable to and detachable from the main body of an electrophotographic apparatus. As the process cartridge, there can be exemplified a process cartridge including a charging member and an electrophotographic photosensitive member placed so as to be chargeable by the charging member, the process cartridge having such a configuration that the conductive member according to the present invention is used as the charging member.

Figure 2:
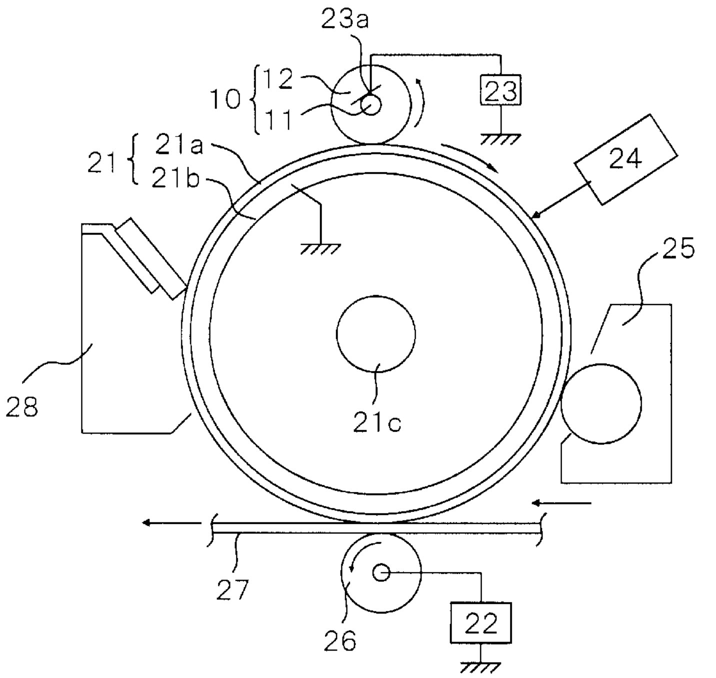
FIG. 2 is a diagram illustrating a schematic configuration example of an electrophotographic apparatus having a charging member.

FIG. 2 illustrates an exemplary schematic configuration of an electrophotographic apparatus (electrophotographic image forming apparatus). A drum-shaped electrophotographic photosensitive member 21 illustrated in FIG. 2 and serving as an object to be charged includes as basic configuration layers a support **21*b* having conductivity such as aluminum, and a photosensitive layer 21*a* formed on the support 21*b*, and is rotationally driven around a shaft 21*c* at the center at a predetermined peripheral speed in a clockwise direction in FIG. 2**.

A charging roller 10 is placed so as to be brought into contact with the electrophotographic photosensitive member 21 and charges the electrophotographic photosensitive member 21 with a predetermined polarity and potential (primary charging). The charging roller 10 includes a mandrel 11 and an elastic layer 12 formed on the mandrel 11, is pressed against the electrophotographic photosensitive member 21 by pressing means (not shown) at both end portions of the mandrel 11, and rotates in accordance with the rotational driving of the electrophotographic photosensitive member 21.

The electrophotographic photosensitive member is subjected to contact charging with a predetermined polarity and potential by applying a predetermined direct current (DC) bias to the mandrel 11 with a rubbing power source **23*a* to be connected to a power source 23. The electrophotographic photosensitive member 21 whose circumferential surface has been charged with the charging roller 10 then receives an exposure of image information of interest (e.g., a laser beam scanning exposure or a slit exposure of a document image) by exposing means 24**. Thus, electrostatic latent images corresponding to the image information of interest are formed on the circumferential surface.

The electrostatic latent images are then sequentially developed into visible images as toner images by developing means 25 having a developing roller. The toner images are then sequentially transferred by transferring means 26 onto a transfer material 27 such as paper taken out of a paper-feeding means portion (not shown) in synchronization with the rotation of the electrophotographic photosensitive member 21 to be conveyed to a transfer portion between the electrophotographic photosensitive member 21 and the transferring means 26 at an appropriate timing. The transferring means 26 illustrated in FIG. 2 is a transferring roller connected to a power source 22, and the toner images on the electrophotographic photosensitive member 21 side are sequentially transferred onto the transfer material 27 by charging with a polarity opposite to that of the toner from the back of the transfer material 27.

The transfer material 27 in which the toner images have been transferred on its surface is separated from the electrophotographic photosensitive member 21, conveyed to fixing means (not shown) where the toner images are fixed, and output as an image-formed product. Alternatively, the material in which the toner images are to be formed on the back surface as well is conveyed to reconveying means (not shown) to the transfer portion.

The circumferential surface of the electrophotographic photosensitive member 21 after image transfer receives a pre-exposure by pre-exposing means (not shown). Thus, residual charges on the electrophotographic photosensitive member 21 are eliminated (charge elimination). Known means may be utilized as this pre-exposing means, and suitable examples thereof include an LED chip array, a fuse lamp, a halogen lamp, or a fluorescence lamp.

The circumferential surface of the electrophotographic photosensitive member 21 after charge elimination is cleaned by removing an adhering contaminant such as transfer residual toner by cleaning means 28, and is subjected to image formation repeatedly.

The charging roller 10 may be driven in accordance with the electrophotographic photosensitive member 21 to be subjected to surface movement driving, may not be allowed to rotate, or may be rotationally driven actively at a predetermined peripheral speed in a forward direction or a reverse direction with respect to the surface movement direction of the electrophotographic photosensitive member 21.

Further, when the electrophotographic apparatus is used as a copying machine, the exposure may be carried out, for example, by reflected light or transmitted light from a document, reading out a document to be converted to signals and scanning a laser beam based on the signals, driving an LED array, or driving a liquid crystal shutter array.

The conductive member of the present invention may be used as the above-mentioned charging roller 10, developing roller, or transferring roller. Examples of the electrophotographic apparatus which may use the conductive member of the present invention include a copying machine, a laser beam printer, an LED printer, and an electrophotographic application apparatus such as an electrophotographic plate making system.

EXAMPLES

Hereinafter, the present invention is described in more detail by way of examples. However, the present invention is by no means limited to these examples. It is to be noted that in the following, the term "part(s)" means "part(s) by mass" unless otherwise stated. In addition, a commercially available high-purity product was used as a reagent or the like unless otherwise specified.

(Surface Treatment of Carbon Black)

<Surface-Treated Carbon Black-1>

A carbon black-1 (trade name: Raven 1170; manufactured by Columbian Carbon) was subjected to a heating treatment under a nitrogen gas atmosphere at 300° C. for 30 minutes. Thus, a surface-treated carbon black-1 was obtained.

<Surface-Treated Carbon Black-2>

The carbon black-1 (trade name: Raven 1170; manufactured by Columbian Carbon) was subjected to a heating treatment under a nitrogen gas atmosphere at 250° C. for 30 minutes. Thus, a surface-treated carbon black-2 was obtained.

<Surface-Treated Carbon Black-3>

A surface-treated carbon black-3 was obtained by performing the same treatment as that of the surface-treated carbon black-1 except that the carbon black-1 was changed to a carbon black-2 (trade name: SUNBLACK 720; manufactured by ASAHI CARBON CO., LTD.).

<Surface-Treated Carbon Black-4>

A surface-treated carbon black-4 was obtained by performing the same treatment as that of the surface-treated carbon black-1 except that the carbon black-1 was changed to a carbon black-3 (trade name: #47; manufactured by Mitsubishi Chemical Corporation).

<Surface-Treated Carbon Black-5>

The carbon black-1 was subjected to an oxidation treatment with a 2 N aqueous solution of sulfuric acid (N: the number of gram equivalents of the reagent in 1 l of the solution) for 18 hours. After that, the treated product was filtered and then water washing was performed until the filtrate became neutral. The resultant solid was dried in a vacuum at 80° C. for 8 hours and then subjected to a pulverization treatment. Thus, a surface-treated carbon black-5 was obtained.

<Surface-Treated Carbon Black-6>

A surface-treated carbon black-6 was obtained by performing the same treatment as that of the surface-treated carbon black-5 except that the carbon black-1 was changed to the carbon black-3.

<Surface-Treated Carbon Black-7>

A surface-treated carbon black-7 was obtained by performing the same treatment as that of the surface-treated carbon black-5 except that the carbon black-1 was changed to a carbon black available under the trade name "Raven 760 ULTRA" (manufactured by Columbian Carbon).

<Surface-Treated Carbon Black-8>

A surface-treated carbon black-8 was obtained by performing the same treatment as that of the surface-treated carbon black-5 except that the carbon black-1 was changed to a carbon black available under the trade name "Printex 300" (manufactured by Evonik Industries).

<Surface-Treated Carbon Black-9>

A surface-treated carbon black-9 was obtained by performing the same treatment as that of the surface-treated carbon black-5 except that the carbon black-1 was changed to a carbon black available under the trade name "REGAL 330" (manufactured by Cabot).

<Surface-Treated Carbon Black-10>

A surface-treated carbon black-10 was obtained by performing the same treatment as that of the surface-treated carbon black-6 except that the treatment liquid to be used in the oxidation treatment was changed to a 2 N aqueous solution of nitric acid.

<Surface-Treated Carbon Black-11>

A surface-treated carbon black-11 was obtained by performing the same treatment as that of the surface-treated carbon black-5 except that the treatment liquid to be used in the oxidation treatment was changed to a 2 N aqueous solution of nitric acid.

Example 1

Preparation of Unvulcanized Rubber Composition

A-kneading rubber materials were mixed with a 6-1 pressure kneader (trade name: TD6-15MDX; manufactured by TOHSHIN CO., LTD.) by the following binder polymer divided mixing mode.

Specifically, first, materials shown in Table 1 below were loaded into the pressure kneader and then mixed at a blade rotational frequency of 40 rpm (40 $min^{-1}$) for 2 minutes.

TABLE 1

| Material | Part(s) by mass |
|---|---|
| NBR as a raw material rubber (trade name: Nipol DN219, manufactured by ZEON CORPORATION) | 66 |
| Zinc stearate as a processing aid | 1 |
| Zinc oxide as a vulcanization supplement accelerator | 5 |

Further, materials shown in Table 2 below were loaded into the pressure kneader and then mixed at a blade rotational frequency of 30 rpm for 4 minutes.

TABLE 2

| Material | Part(s) by mass |
|---|---|
| Carbon black-1 as a first CB (trade name: Raven 1170) | 26 |
| Calcium carbonate (trade name: Silver W, manufactured by SHIRAISHI KOGYO) | 20 |

Further, materials shown in Table 3 below were loaded into the pressure kneader and then mixed at a blade rotational frequency of 30 rpm for 4 minutes.

TABLE 3

| Material | Part(s) by mass |
|---|---|
| MT carbon as a second CB (trade name: Thermax Floform N990, manufactured by CanCab) | 30 |

Finally, materials shown in Table 4 below were loaded into the pressure kneader and then mixed at a blade rotational frequency of 30 rpm for 10 minutes. Thus, an A-kneading rubber composition was obtained.

TABLE 4

| Material | Part(s) by mass |
|---|---|
| NBR as a raw material rubber (trade name: Nipol DN219, manufactured by ZEON CORPORATION) | 34 |

It is to be noted that in the A-kneading mixing, the loading masses of the materials were adjusted so that the fill factor of the pressure kneader was 80 vol % at the time point when all the materials were finally loaded.

Materials shown in Table 5 below were mixed into 182 parts of the A-kneading rubber composition with an open mill having a roll diameter of 12 inches (0.30 m) at a front roll rotational frequency of 8 rpm, a back roll rotational frequency of 10 rpm, and a roll interval of 2 mm for 20 minutes. Thus, an unvulcanized rubber composition for an elastic layer was obtained.

TABLE 5

| Material | Part(s) by mass |
|---|---|
| Sulfur (trade name: SULFAX PMC, manufactured by Tsurumi Chemical Industry Co., Ltd.) | 1.2 |
| Vulcanization accelerator tetramethylthiuram monosulfide (trade name: NOCCELER TBzTD, manufactured by OUCHI SHINKO CHEMICAL INDUSTRIAL CO., LTD.) | 4 |

(Production of Charging Roller)

A conductive vulcanizing adhesive (trade name: METALOC U-20, manufactured by Toyo Kagaku Kenkyusho Co., Ltd.) was applied to a central portion having a length of 226 mm in the axial direction of the cylindrical surface of a solid, cylindrical conductive mandrel (made of steel and having a nickel-plated surface) having a diameter of 6 mm and a length of 252 mm, and was then dried at 80° C. for 30 minutes. Next, the unvulcanized rubber composition was simultaneously extruded, by extrusion molding using a cross head, into a cylindrical shape in a coaxial fashion around the mandrel. Thus, an unvulcanized rubber roller which had a diameter of 8.8 mm and the outer circumference of the mandrel of which was coated with the unvulcanized rubber composition was produced. An extruder having a cylinder diameter of 45 mm (Φ45) and a ratio "screw effective length (L)/screw diameter (D)" of 20 was used as an extruder, and the temperatures of a head, a cylinder, and a screw were set to 90° C., 90° C., and 90° C., respectively, at the time of the extrusion. Both ends of the unvulcanized rubber roller thus molded were cut, and the width in the axial direction of an elastic layer portion was set to 228 mm. After that, the resultant was subjected to a heating treatment in an electric furnace at 160° C. for 40 minutes to provide a vulcanized rubber roller. The surface of the resultant vulcanized rubber roller was ground with a grinder of a plunge cut grinding mode. Thus, an elastic rubber roller having an elastic layer of a crown shape with an end portion diameter of 8.35 mm and a central portion diameter of 8.50 mm was obtained.

A surface treatment was performed by irradiating the surface of the resultant elastic rubber roller with a UV ray. Thus, a charging roller having a surface-treated elastic layer was obtained. A low-pressure mercury lamp manufactured by HARISON TOSHIBA LIGHTING Corporation was used in the UV irradiation, and the surface was irradiated with a UV ray having a wavelength of 254 nm so that its cumulative light quantity was 15,000 mJ/$cm^2$. It is to be noted that the elastic rubber roller was irradiated with the UV ray while being rotated by a member for roller rotation at a speed of 60 rpm. The cumulative light quantity of the UV ray is defined as described below.

Cumulative light quantity of UV ray [mJ/$cm^2$]=intensity of UV ray [mW/$cm^2$]×irradiation time [*s*]

The cumulative light quantity of the UV ray can be regulated depending on the settings of, for example, the irradiation time, a lamp output, and a distance between the lamp and the object to be irradiated, and the cumulative light quantity of the UV ray was measured with a UV ray cumulative light quantity meter available under the trade name "UIT-150-A" from USHIO INC.

(Evaluation for Carbon Dispersion Degree)

An evaluation for the dispersion degree of a carbon black (carbon dispersion degree) in the surface-treated elastic layer of the resultant charging roller was performed by observing the surface of the elastic layer with an optical microscope. Evaluation criteria are as described below.

A: A dispersion failure of a carbon black having a diameter of 20 μm or more is not observed.

B: A dispersion failure of a carbon black having a diameter of 20 μm or more and less than 50 μm is observed.

C: A dispersion failure of a carbon black having a diameter of 50 μm or more and less than 100 μm is observed.

D: A dispersion failure of a carbon black having a diameter of 100 μm or more is observed.

(Measurement of Electric Resistance and Circumferential Direction Unevenness of Electric Resistance)

Figure 4:
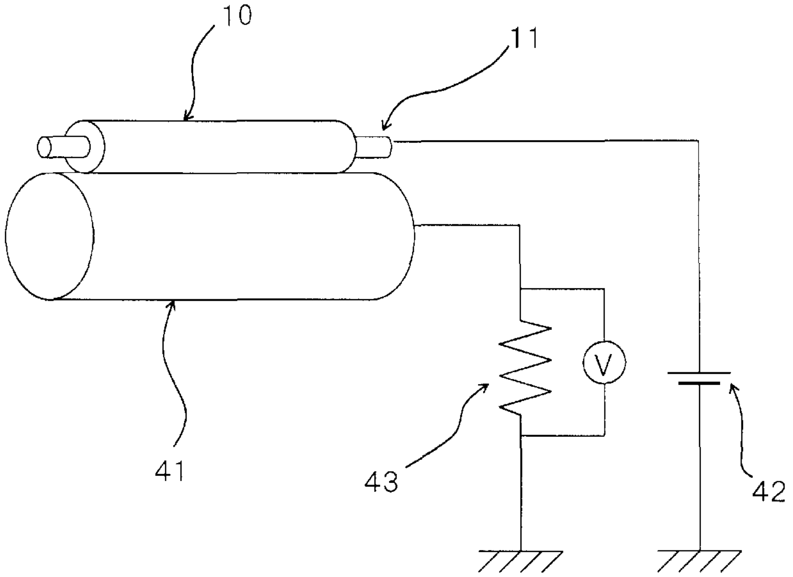
FIG. 4 is a diagram illustrating a schematic configuration example of an apparatus for measuring the electric resistance of a charging roller.

FIG. 4 illustrates the schematic configuration of an apparatus for measuring the electric resistance of a charging roller. Both end portions of the mandrel 11 of the charging roller 10 are brought into press contact with a cylindrical aluminum drum 41 having a diameter of 30 mm by pressing means (not shown), and the roller rotates in accordance with the rotational driving of the aluminum drum 41. In the state, a DC voltage was applied to the mandrel portion 11 of the charging roller 10 with an external power source 42 and then a voltage applied to a reference resistance 43 connected in series with the aluminum drum 41 was measured. It is to be noted that the electric resistance of the charging roller 10 can be calculated from the measured voltage of the reference resistance 43 according to the following equation.

$$R=V_1\times R_b/V_m$$

(R represents the electric resistance of the charging roller, $V_1$ represents the applied voltage, $R_b$ represents the reference resistance value, and $V_m$ represents the measured voltage of the reference resistance.)

The electric resistance of the charging roller was measured under an environment (NN environment) having a temperature of 23° C. and a humidity of 50% R.H. (relative humidity) with the apparatus of FIG. 4 by applying a DC voltage of 200 V to a gap between the mandrel and the aluminum drum for 2 seconds. The rotational frequency of the aluminum drum at this time was set to 30 rpm. In addition, the resistance value of the reference resistance was adjusted so as to be 1/100 of the resistance value of the charging roller. Data sampling was performed 1 second after the application of the voltage at an interval of 1 second and a frequency of 1,000 Hz, and the average of the resultant electric resistances was defined as the resistance value of the charging roller. In addition, a ratio (the maximum electric resistance of the charging roller/the minimum electric resistance of the charging roller) between the maximum and minimum of the measured electric resistances of the charging roller was calculated as the circumferential direction unevenness of the electric resistance of the charging roller. As a result, the electric resistance of the charging roller was $8.0\times10^4\Omega$ (8.0E+04) and the circumferential direction unevenness of the resistance was 1.2 times.

(Measurement of MD-1 Hardness)

The MD-1 hardness of the surface of the charging roller was measured. The measurement was performed with a micro durometer type MD-1 (manufactured by KOBUNSHI KEIKI CO., LTD.) under a 23° C., 55% RH environment in a "PEAK HOLD" mode. More specifically, the charging roller was placed on a metallic plate and then simply fixed by placing a metallic block so that the charging roller did not roll away. A measuring terminal was pressed exactly against the center of the charging roller from a direction perpendicular to the metallic plate and then a peak value during 5 seconds of the measurement was read out. The measurement was performed for three sites in the circumferential direction of each of both end portions each located 30 to 40 mm away from the rubber end portion of the charging roller and the central portion of the charging roller, i.e., a total of nine sites. The average of the resultant measured values was defined as the hardness of the surface-treated elastic layer. As a result, the hardness of the surface-treated elastic layer was 66°.

Example 2

A charging roller was produced in the same manner as in Example 1 except that the carbon black-1 was changed to the surface-treated carbon black-2. Its carbon (CB) dispersion degree, its electric resistance, the circumferential direction unevenness of the electric resistance, and its MD-1 hardness were each measured in the same manner as in Example 1.

Example 3

A charging roller was produced in the same manner as in Example 1 except that the carbon black-1 was changed to the surface-treated carbon black-3 and its compounding amount was set to 25 parts by mass. Its carbon dispersion degree, its electric resistance, the circumferential direction unevenness of the electric resistance, and its MD-1 hardness were each measured in the same manner as in Example 1.

Example 4

A charging roller was produced in the same manner as in Example 1 except that the carbon black-1 was changed to the surface-treated carbon black-5 and its compounding amount was set to 28 parts by mass. Its carbon dispersion degree, its electric resistance, the circumferential direction unevenness of the electric resistance, and its MD-1 hardness were each measured in the same manner as in Example 1.

Example 5

A charging roller was produced in the same manner as in Example 1 except that the carbon black-1 was changed to the surface-treated carbon black-6 and its compounding amount was set to 29 parts by mass. Its carbon dispersion degree, its electric resistance, the circumferential direction unevenness of the electric resistance, and its MD-1 hardness were each measured in the same manner as in Example 1.

Example 6

A charging roller was produced in the same manner as in Example 5 except that in the mixing of the A-kneading rubber, the binder polymer, specifically, the NBR as a raw material rubber was not mixed in a divided fashion but its total amount (100 parts by mass) was loaded at the beginning of the mixing. Its carbon dispersion degree, its electric resistance, the circumferential direction unevenness of the electric resistance, and its MD-1 hardness were each measured in the same manner as in Example 1.

Example 7

A charging roller was produced in the same manner as in Example 6 except that the compounding amount of the surface-treated carbon black-6 was changed to 30 parts by mass and the MT carbon was not compounded. Its carbon dispersion degree, its electric resistance, the circumferential direction unevenness of the electric resistance, and its MD-1 hardness were each measured in the same manner as in Example 1.

Example 8

A charging roller was produced in the same manner as in Example 1 except that the carbon black-1 was changed to the surface-treated carbon black-7 and its compounding amount was set to 32 parts by mass. Its carbon dispersion degree, its electric resistance, the circumferential direction unevenness of the electric resistance, and its MD-1 hardness were each measured in the same manner as in Example 1.

Example 9

A charging roller was produced in the same manner as in Example 1 except that the carbon black-1 was changed to the surface-treated carbon black-9 and its compounding amount was set to 31 parts by mass. Its carbon dispersion degree, its electric resistance, the circumferential direction unevenness of the electric resistance, and its MD-1 hardness were each measured in the same manner as in Example 1.

Example 10

A charging roller was produced in the same manner as in Example 1 except that the carbon black-1 was changed to the surface-treated carbon black-11. Its carbon dispersion degree, its electric resistance, the circumferential direction unevenness of the electric resistance, and its MD-1 hardness were each measured in the same manner as in Example 1.

Comparative Example 1

A charging roller was produced in the same manner as in Example 1 except that the carbon black-1 was changed to the carbon black-2 and its compounding amount was set to 25 parts by mass. Its carbon dispersion degree, its electric resistance, the circumferential direction unevenness of the electric resistance, and its MD-1 hardness were each measured in the same manner as in Example 1.

Comparative Example 2

A charging roller was produced in the same manner as in Example 1 except that the carbon black-1 was changed to the carbon black-3 and its compounding amount was set to 28 parts by mass. Its carbon dispersion degree, its electric resistance, the circumferential direction unevenness of the electric resistance, and its MD-1 hardness were each measured in the same manner as in Example 1.

Comparative Example 3

A charging roller was produced in the same manner as in Example 1 except that the carbon black-1 was changed to the carbon black-4 (trade name: Raven 2000; manufactured by Columbian Carbon) and its compounding amount was set to 25 parts by mass. Its carbon dispersion degree, its electric resistance, the circumferential direction unevenness of the electric resistance, and its MD-1 hardness were each measured in the same manner as in Example 1.

Comparative Example 4

A charging roller was produced in the same manner as in Example 1 except that the carbon black-1 was changed to the carbon black-5 (trade name: Raven 760 ULTRA; manufactured by Columbian Carbon) and its compounding amount was set to parts by mass. Its carbon dispersion degree, its electric resistance, the circumferential direction unevenness of the electric resistance, and its MD-1 hardness were each measured in the same manner as in Example 1.

Comparative Example 5

A charging roller was produced in the same manner as in Example 1 except that the carbon black-1 was changed to the surface-treated carbon black-8 and its compounding amount was set to 32 parts by mass. Its carbon dispersion degree, its electric resistance, the circumferential direction unevenness of the electric resistance, and its MD-1 hardness were each measured in the same manner as in Example 1.

Comparative Example 6

A charging roller was produced in the same manner as in Example 1 except that the carbon black-1 was changed to the surface-treated carbon black-1 and its compounding amount was set to 25 parts by mass. Its carbon dispersion degree, its electric resistance, the circumferential direction unevenness of the electric resistance, and its MD-1 hardness were each measured in the same manner as in Example 1.

Comparative Example 7

A charging roller was produced in the same manner as in Example 1 except that the carbon black-1 was changed to the surface-treated carbon black-4. Its carbon dispersion degree, its electric resistance, the circumferential direction unevenness of the electric resistance, and its MD-1 hardness were each measured in the same manner as in Example 1.

Comparative Example 8

A charging roller was produced in the same manner as in Example 1 except that the carbon black-1 was changed to the surface-treated carbon black-10 and its compounding amount was set to 29 parts by mass. Its carbon dispersion degree, its electric resistance, the circumferential direction unevenness of the electric resistance, and its MD-1 hardness were each measured in the same manner as in Example 1.

Table 6 shows the characteristics of the carbon blacks used in the respective examples and the respective comparative examples, and the results of the analysis of the amounts of gases generated by their heating. It is to be noted that the average primary particle diameter and DBP oil absorption of each carbon black were measured by the methods described above. In addition, the amounts of gases generated by the heating of each carbon black, i.e., the amounts of the surface functional groups of the carbon black were measured by the following method.

(Measurement of Amounts of Surface Functional Groups of Carbon Black)

The temperature programmed desorption/mass spectrometry of each of the carbon blacks used in the examples and the comparative examples was performed with an MS apparatus (trade name: GCMS-QP5050A; manufactured by Shimadzu Corporation) directly coupled with a heating apparatus equipped with a temperature controller. At that time, 8 mg of the carbon black sample were set in the heating apparatus and then heated from room temperature (25° C.) to 1,000° C. in a helium gas atmosphere under the condition of a rate of temperature increase of 20° C./min, followed by the measurement of the amounts of generated gases, i.e., carbon monoxide, carbon dioxide, and sulfur dioxide.

TABLE 6

| | | | Surface analysis | | | |
|---|---|---|---|---|---|---|
| | Average primary particle diameter (nm) | DBP oil absorption (ml/100 g) | (1) Amount of generation of CO (mass %) | (2) Amount of generation of $CO_2$ (mass %) | (1) + (2) (mass %) | Amount of generation of $SO_2$ (mass %) |
| Carbon Black-1 | 21 | 55 | 0.30 | 0.22 | 0.52 | 0.09 |
| Carbon Black-2 | 20 | 56 | 0.47 | 0.37 | 0.84 | 0.10 |
| Carbon Black-3 | 23 | 60 | 0.30 | 0.43 | 0.73 | 0.04 |
| Carbon Black-4 | 18 | 65 | 0.32 | 0.25 | 0.57 | 0.05 |
| Carbon Black-5 | 31 | 48 | 0.22 | 0.19 | 0.41 | 0.05 |
| Surface-treated carbon black-1 | 21 | 55 | 0.13 | 0.15 | 0.28 | 0.07 |
| Surface-treated carbon black-2 | 21 | 55 | 0.15 | 0.16 | 0.31 | 0.09 |
| Surface-treated carbon black-3 | 20 | 56 | 0.21 | 0.11 | 0.32 | 0.06 |
| Surface-treated carbon black-4 | 23 | 60 | 0.13 | 0.17 | 0.30 | 0.04 |
| Surface-treated carbon black-5 | 21 | 55 | 0.32 | 0.23 | 0.55 | 0.15 |
| Surface-treated carbon black-6 | 23 | 60 | 0.33 | 0.46 | 0.79 | 0.06 |
| Surface-treated carbon black-7 | 30 | 58 | 0.32 | 0.26 | 0.58 | 0.07 |
| Surface-treated carbon black-8 | 27 | 72 | 0.22 | 0.19 | 0.41 | 0.06 |
| Surface-treated carbon black-9 | 25 | 70 | 0.26 | 0.24 | 0.50 | 0.08 |
| Surface-treated carbon black-10 | 23 | 60 | 0.38 | 0.45 | 0.82 | 0.05 |
| Surface-treated carbon black-11 | 21 | 55 | 0.41 | 0.36 | 0.78 | 0.10 |

Subsequently, Table 7 and Table 8 show the compositions of the charging rollers produced in the respective examples and the respective comparative examples, and the results of their evaluations.

TABLE 7

| | Example | | | | | | | | | |
|---|---|---|---|---|---|---|---|---|---|---|
| | 1 | 2 | 3 | 4 | 5 | 6 | 7 | 8 | 9 | 10 |
| NBR | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 |
| Zinc stearate | 1 | 1 | 1 | 1 | 1 | 1 | 1 | 1 | 1 | 1 |
| Calcium carbonate | 20 | 20 | 20 | 20 | 20 | 20 | 20 | 20 | 20 | 20 |
| MT carbon | 30 | 30 | 30 | 30 | 30 | 30 | | 30 | 30 | 30 |
| Carbon black-1 | 26 | — | — | — | — | — | — | — | — | — |
| Surface-treated carbon black-2 | — | 26 | — | — | — | — | — | — | — | — |
| Surface-treated carbon black-3 | — | — | 25 | — | — | — | — | — | — | — |
| Surface-treated carbon black-5 | — | — | — | 28 | — | — | — | — | — | — |
| Surface-treated carbon black-6 | — | — | — | — | 29 | 29 | 30 | — | — | — |
| Surface-treated carbon black-7 | — | — | — | — | — | — | — | 32 | — | — |

TABLE 7-continued

| | Example | | | | | | | | | |
|---|---|---|---|---|---|---|---|---|---|---|
| | 1 | 2 | 3 | 4 | 5 | 6 | 7 | 8 | 9 | 10 |
| Surface-treated carbon black-9 | — | — | — | — | — | — | — | — | 31 | — |
| Surface-treated carbon black-11 | — | — | — | — | — | — | — | — | — | 26 |
| Sulfur | 1.2 | 1.2 | 1.2 | 1.2 | 1.2 | 1.2 | 1.2 | 1.2 | 1.2 | 1.2 |
| Vulcanization accelerator | 4 | 4 | 4 | 4 | 4 | 4 | 4 | 4 | 4 | 4 |
| Mixing method | Divided | Divided | Divided | Divided | Divided | Collective | Collective | Divided | Divided | Divided |
| MD-1 hardness (°) | 66 | 66 | 65 | 67 | 66 | 66 | 56 | 69 | 68 | 66 |
| CB dispersion degree | A | B | B | A | A | B | C | A | A | A |
| Electric resistance of roller (Ω) | 8.0E+04 | 5.1E+04 | 6.7E+04 | 1.1E+05 | 1.3E+05 | 9.5E+04 | 5.0E+04 | 2.6E+05 | 8.9E+04 | 9.0E+04 |
| Circumferential direction unevenness of electric resistance of roller (time(s)) | 1.2 | 1.3 | 1.5 | 1.1 | 1.4 | 1.3 | 1.1 | 1.6 | 1.9 | 1.8 |

TABLE 8

| | Comparative Example | | | | | | | |
|---|---|---|---|---|---|---|---|---|
| | 1 | 2 | 3 | 4 | 5 | 6 | 7 | 8 |
| NBR | 100 | 100 | 100 | 100 | 100 | 100 | 100 | 100 |
| Zinc oxide | 5 | 5 | 5 | 5 | 5 | 5 | 5 | 5 |
| Zinc stearate | 1 | 1 | 1 | 1 | 1 | 1 | 1 | 1 |
| Calcium carbonate | 20 | 20 | 20 | 20 | 20 | 20 | 20 | 20 |
| MT carbon | 30 | 30 | 30 | 30 | 30 | 30 | 30 | 30 |
| Carbon black-2 | 25 | — | — | — | — | — | — | — |
| Carbon black-3 | — | 28 | — | — | — | — | — | — |
| Carbon black-4 | — | — | 25 | — | — | — | — | — |
| Carbon black-5 | — | — | — | 40 | — | — | — | — |
| Surface-treated carbon black-1 | — | — | — | — | — | 25 | — | — |
| Surface-treated carbon black-4 | — | — | — | — | — | — | 26 | — |
| Surface-treated carbon black-8 | — | — | — | — | 32 | — | — | — |
| Surface-treated carbon black-10 | — | — | — | — | — | — | — | 29 |
| Sulfur | 1.2 | 1.2 | 1.2 | 1.2 | 1.2 | 1.2 | 1.2 | 1.2 |
| Vulcanization accelerator | 4 | 4 | 4 | 4 | 4 | 4 | 4 | 4 |
| Mixing method | Divided | Divided | Divided | Divided | Divided | Divided | Divided | Divided |
| MD-1 hardness (°) | 65 | 65 | 61 | 75 | 69 | 65 | 64 | 66 |
| CB dispersion degree | A | D | D | A | A | D | D | A |
| Electric resistance of roller (Ω) | 6.1E+04 | 7.7E+04 | 5.7E+03 | 6.5E+04 | 1.8E+05 | 7.4E+04 | 5.6E+04 | 6.9E+04 |
| Circumferential direction unevenness of electric resistance of roller (time(s)) | 2.5 | 2.3 | 1.8 | 3.1 | 3.5 | 1.6 | 1.4 | 2.8 |

As is apparent from Table 6 and Table 8, the total amount of generation of CO and $CO_2$ of each of the carbon black-2 used in Comparative Example 1 and the surface-treated carbon black-10 used in Comparative Example 8 in the carbon surface functional group analysis was 0.80 mass % or more. Accordingly, the circumferential direction unevenness of the electric resistance in each of the charging rollers produced in Comparative Examples 1 and 8 was as large as 2.0 times or more.

The amount of generation of $SO_2$ of the carbon black-3 used in Comparative Example 2 in the carbon surface functional group analysis was less than 0.05 mass %. Accordingly, the result of the evaluation for the dispersion degree of the carbon black in the elastic layer in the charging roller produced in Comparative Example 2 was the D rank.

The average primary particle diameter of the carbon black-4 used in Comparative Example 3 was less than 20 nm. Accordingly, the result of the evaluation for the dispersion degree of the carbon black in the elastic layer was the D rank. The average primary particle diameter of the carbon black-5 used in Comparative Example 4 exceeded 30 nm. Accordingly, the compounding of a relatively large amount of the carbon black was desired for the adjustment of the electric resistance and hence the hardness became as high as 75° or more. In addition, the circumferential direction unevenness of the electric resistance of the charging roller became 2 times or more.

The DBP oil absorption of the surface-treated carbon black-8 used in Comparative Example 5 exceeded 70 ml/100 g. Accordingly, the circumferential direction unevenness of the electric resistance in the charging roller was as large as 3.0 times or more.

The amounts of the carbon surface functional groups of each of the surface-treated carbon black-1 used in Comparative Example 6 and the surface-treated carbon black-4 used in Comparative Example 7 were small. Accordingly, the result of the evaluation for the dispersion degree of each of the carbon blacks in the elastic layer was the D rank.

In contrast, as is apparent from Table 7, in each of Examples 1 to 10 each using a carbon black satisfying the requirements of the first CB, the MD-1 hardness was less than 75° and the circumferential direction unevenness of the electric resistance of the roller was less than 2 times.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-207958, filed Sep. 21, 2012, which is hereby incorporated by reference herein in its entirety.

What is claimed is:

1. A conductive member, comprising:

a conductive support; and a conductive elastic layer, wherein:

the elastic layer comprises a mixture containing an electron conductive agent and a binder polymer, or a cured product of the mixture; and the electron conductive agent contains a carbon black having the following characteristics (i) to (iii):

(i) an average primary particle diameter is 20 nm or more and 30 nm or less;

(ii) a DBP oil absorption is 40 ml/100 g or more and 70 ml/100 g or less; and (iii) a total amount of CO and $CO_2$ generated by temperature programmed desorption/mass spectrometry is 0.30 mass % or more and 0.80 mass % or less with reference to the carbon black, and an amount of $SO_2$ generated by the temperature programmed desorption/mass spectrometry is 0.05 mass % or more with reference to the carbon black.

2. The conductive member according to claim 1, wherein the amount of $SO_2$ generated by the temperature programmed desorption/mass spectrometry is 0.15 mass % or less with reference to the carbon black.

3. The conductive member according to claim 1, wherein a content of the carbon black in the elastic layer is 5 parts by mass or more and 60 parts by mass or less with respect to 100 parts by mass of the binder polymer or a cured product thereof.

4. The conductive member according to claim 1, wherein the electron conductive agent further contains a carbon black having the following characteristics (iv) and (v):

(iv) an average primary particle diameter is 100 nm or more and 300 nm or less; and (v) a DBP oil absorption is 20 ml/100 g or more and 50 ml/100 g or less.

5. The conductive member according to claim 1, wherein the binder polymer contains a rubber.

6. A process cartridge that is attachable to and detachable from a main body of an electrophotographic apparatus, the process cartridge comprising:

a charging member; and an electrophotographic photosensitive member placed to be chargeable by the charging member, wherein the charging member comprises the conductive member according to claim 1.

7. An electrophotographic apparatus, comprising:

a charging member; and an electrophotographic photosensitive member placed to be chargeable by the charging member, wherein the charging member comprises the conductive member according to claim 1.

* * * * *